US012153909B1

(12) United States Patent
Cucchiara et al.

(10) Patent No.: US 12,153,909 B1
(45) Date of Patent: Nov. 26, 2024

(54) METHODS AND SYSTEMS OF CONTROLLING DEPLOYMENT OF SOFTWARE BASED UPON AN APPLICATION RELIABILITY ANALYSIS

(71) Applicant: MORGAN STANLEY SERVICES GROUP INC., New York, NY (US)

(72) Inventors: Salvatore Cucchiara, Princeton Junction, NJ (US); Alberto Ramos, Milltown, NJ (US); Vasantha Kumar, Princeton, NJ (US); Rita Chaturvedi, Edison, NJ (US); Judith Christi Joy, Princeton, NJ (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/388,527

(22) Filed: Nov. 9, 2023

(51) Int. Cl.
*G06F 8/60* (2018.01)
(52) U.S. Cl.
CPC ..................... *G06F 8/60* (2013.01)
(58) Field of Classification Search
CPC ........................................................ G06F 8/60
USPC ...................................................... 717/174
See application file for complete search history.

(56) References Cited

U.S. PATENT DOCUMENTS

| | | | |
|---|---|---|---|
| 9,134,986 B2 * | 9/2015 | Ricci | G06F 8/61 |
| 9,558,464 B2 * | 1/2017 | Bassin | G06Q 10/0635 |
| 9,971,669 B2 * | 5/2018 | Chahal | G06F 11/3428 |
| 10,740,692 B2 * | 8/2020 | Mann | G06F 16/313 |
| 10,789,054 B2 * | 9/2020 | Gnazdowsky | G06F 16/9024 |
| 11,221,908 B1 * | 1/2022 | Batta | G06F 11/3072 |
| 11,816,476 B2 * | 11/2023 | Karlsson | G06F 8/71 |
| 12,001,327 B2 * | 6/2024 | Bregman | G06F 11/3688 |
| 2011/0161743 A1 * | 6/2011 | Kato | G06F 11/0709 714/47.2 |
| 2014/0157235 A1 * | 6/2014 | Bird | G06F 11/008 717/121 |
| 2015/0170442 A1 * | 6/2015 | Senalp | G07C 5/0808 701/29.1 |
| 2016/0196501 A1 * | 7/2016 | Anand | G06F 16/345 706/46 |
| 2016/0373478 A1 * | 12/2016 | Doubleday | G06F 8/65 |
| 2017/0034023 A1 * | 2/2017 | Nickolov | H04L 43/0817 |
| 2019/0044969 A1 * | 2/2019 | Pilkington | H04L 63/1433 |
| 2019/0129701 A1 * | 5/2019 | Hawrylo | G06F 8/71 |
| 2019/0289029 A1 * | 9/2019 | Chawla | H04L 63/1425 |
| 2021/0012179 A1 * | 1/2021 | Kalia | G06F 40/284 |
| 2021/0141718 A1 * | 5/2021 | Sandhu | G06F 8/60 |
| 2021/0149658 A1 * | 5/2021 | Cannon | G06N 3/04 |

(Continued)

*Primary Examiner* — Francisco J Aponte
(74) *Attorney, Agent, or Firm* — WEITZMAN LAW OFFICES, LLC

(57) ABSTRACT

A system and method for controlling deployment of one or more changes to one or more applications of a computer system based upon an application reliability analysis. The system collects information related to one or more applications deployed on a system which require changes from one or more resources; generates a change risk score for each application based at least in part on a weighted average of one or more parameters affecting system quality, a weighted average of one or more parameters affecting system performance, and a weighted average of one or more parameters affecting system stability, and determines whether to perform an automated deployment process or prevent the deployment of application changes for each application.

19 Claims, 9 Drawing Sheets

(56) References Cited

U.S. PATENT DOCUMENTS

| | | | |
|---|---|---|---|
| 2021/0241169 A1* | 8/2021 | Gupta | G06N 20/00 |
| 2021/0406760 A1* | 12/2021 | Duesterwald | G06N 5/013 |
| 2022/0230090 A1* | 7/2022 | Batta | G06N 20/00 |
| 2023/0028044 A1* | 1/2023 | Luo | G06F 16/283 |
| 2023/0029624 A1* | 2/2023 | Olejarz | G06F 8/77 |
| 2023/0067057 A1* | 3/2023 | Verma | G06F 9/5072 |
| 2023/0205509 A1* | 6/2023 | Baral | G06F 8/65 |
| | | | 717/172 |
| 2024/0012643 A1* | 1/2024 | Donthireddy | H04L 41/22 |

* cited by examiner

| Factor | Parameter – Input Resource | Weight | Parameter Score | Total Score | Scoring Criteria |
|---|---|---|---|---|---|
| Quality | Code Coverage | 5% | | | 1 – Code tested percentage less than 50 %<br>2 – Code tested percentage less than 75%<br>3 – Code tested percentage less than 95%<br>4 – Code tested percentage less than 100% |
| | Code Quality | 3% | | | 1 – No Services Owned<br>2 – 1 to 2 Services Owned<br>3 – 3 to 5 Services Owned<br>4 – 5 to 10 Services Owned<br>5 – More than 10 Services Owned |
| | No of pull request | 5% | | | > 10 and < 31: 1<br>> 31 and < 100: 2<br>> 101 and <200: 3<br>> 201 and <300: 4<br>>301: 5 |
| | Type of Change | 5% | | | Maintenance: 1<br>Bug Fix: 2<br>New Feature Pilot: 3<br>New Feature Big Bang: 4 |
| | Tasks per release | 3% | | | > 1 and < 10: 2<br>> 11 and < 30: 3<br>> 31 and <50: 4<br>> 51: 5 |

| Factor | Parameter – Input Resource | Weight | Parameter Score | Total Score | Scoring Criteria |
|---|---|---|---|---|---|
| Performance | Error Budget | 3% | | | 1 – No Services Consumed<br>2 – 1 to 2 Services Consumed<br>3 – 3 to 5 Consumed<br>4 – 6 to 10 Services Consumed<br>5 – More than 10 Services Consumed |
| | Application Resiliency | 5% | | | 1 – Tier 3 or 4 or No Tier Available<br>2 – Tier 2; 3 – Tier 1 |
| | 24/7 Monitoring for FCI/memory and CPU performance | 15% | | | 1 – Any one of Pure C/C++/Java/.NET/SQL<br>2 – Combination of 2 languages<br>3 – Combination of more than 2 languages or language data is missing |
| | Vendor Involvement | 3% | | | 1 – No Vendor Involved<br>2 – 1 Vendor Involved<br>3 – More than 1 Vendor |
| | Asset Risk Classification (ARR) | 10% | | | P3:1; P2:2; P1:3 |
| | Application Dependency (IRR) | 5% | | | I2: 1; I1: 2; I0: 3 |
| | Fall back plan for No of new components per release | 2% | | | Yes: 1; No: 2 |
| | No of new deployable units per release | 4% | | | >1 and < 10: 2; >11 and < 30: 3<br>>31 and < 50: 4; >51: 5 |
| | Vendor application or In house application | 5% | | | In house App: 1; Vendor app: 5 |

| Factor | Parameter – Input Resource | Weight | Parameter Score | Total Score | Scoring Criteria |
|---|---|---|---|---|---|
| Stability | FCI for last 6 months | 10% | | | >1 and < 100: 1<br>>101 and < 500: 2<br>> 501 and < 1000: 3<br>> 1001 and < 2000: 4<br>> 2001: 5 |
| | Applications adopted Rails for deployment | 5% | | | Yes: 1<br>No: 2 |
| | Changes are automatically verified after deployment | 2% | | | Yes: 1<br>No: 2 |
| | No of incidents for past 6 months | 10% | | | S5: 1<br>S4: 2<br>S3: 3<br>S2: 4<br>S1: 5 |

| Scoring Range | Risk Level |
|---|---|
| 0 to 1 | Low |
| 1 to 1.5 | Low Medium |
| 1.5 to 2.5 | Medium |
| 2.5 to 3 | Medium High |
| > 3 | High |

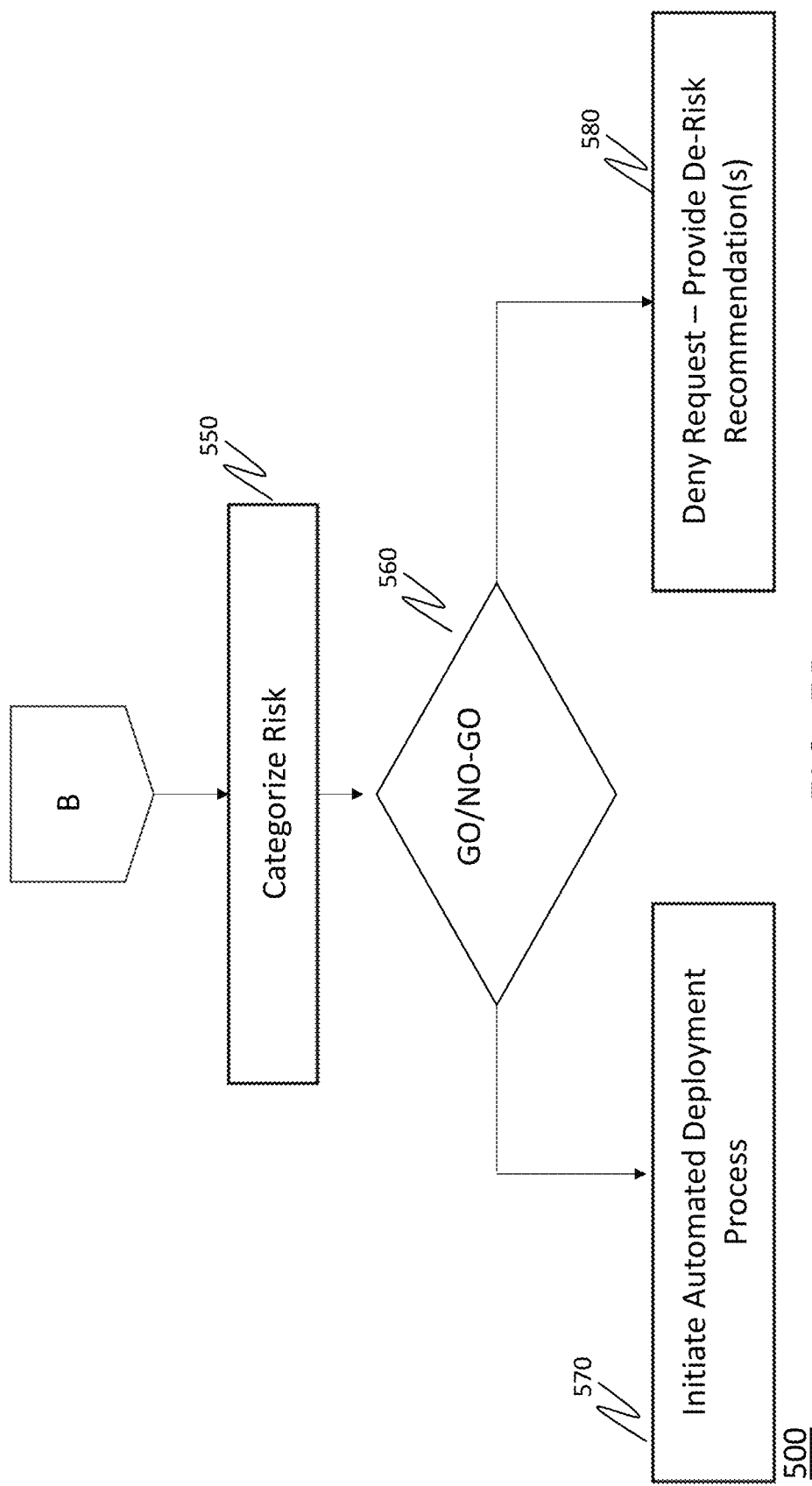

METHODS AND SYSTEMS OF CONTROLLING DEPLOYMENT OF SOFTWARE BASED UPON AN APPLICATION RELIABILITY ANALYSIS

FIELD OF INVENTION

This application relates to automated software change deployment and, more particularly, to systems and methods for controlling when changes are deployed based on the outcome of an application reliability analysis.

BACKGROUND

Many modern enterprises provide real-time services to users for twenty-four hours, seven days a week. Critical to the success in providing these services is minimizing service disruptions. Because over time, many service applications will require changes, it is essential to manage the deployment of these changes in an efficient manner that will minimize service interruptions. Premature deployment of an unstable application may lead to unexpected errors or downtime, further downtime while rolling back changes, and downstream negative affects from any further software or workflows that rely on the application being immediately available.

If humans were making deployment decisions based on a personal assessment, the final decision risks failing to take into account all available data points and substituting a holistic analysis for an objective, quantifiable one. Thus, there is a need to automatically assess application readiness and manage the scheduling of application changes in an effective way to maintain consistent reliability of the applications in an enterprise system.

SUMMARY OF THE INVENTION

A system for controlling deployment of one or more changes to one or more applications in a computer system based upon an application reliability analysis comprising one or more input resources: one or more storage devices, including at least one database; one or more processors: one or more network interfaces for communication with the one or more input resources; and a non-transitory memory comprising instructions. The instructions cause the processor to collect information related to one or more applications deployed on a system which require changes from one or more resources: generate, using the information collected from the one or more resources, a change risk score for each application based on a weighted average of one or more parameters affecting system quality, a weighted average of one or more parameters affecting system performance, and a weighted average of one or more parameters affecting system stability: determine for each of the one or more applications whether the changes for a corresponding application should be deployed based on the application's change risk score: perform an automated deployment process for each application in which it has been determined that the changes should be deployed; and prevent the deployment of application changes for each application in which it has been determined that the changes should not be deployed.

A computer implemented method for controlling deployment of one or more changes to one or more applications in a computer system based upon an application reliability analysis is also disclosed. The method comprises collecting information related to one or more applications deployed on a system which require changes from one or more resources; generating, using the information collected from the one or more resources, a change risk score for each application based on a weighted average of one or more parameters affecting system quality, a weighted average of one or more parameters affecting system performance, and a weighted average of one or more parameters affecting system stability: determining for each of the one or more applications whether the changes for a corresponding application should be deployed based on the application's change risk score: performing an automated deployment process for each application in which it has been determined that the changes should be deployed; and preventing the deployment of application changes for each application in which it has been determined that the changes should not be deployed.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

FIG. 2A depicts an example input resource-parameter table as used by methods and systems disclosed herein.

FIG. 2B depicts a continuation of the example input resource-parameter table of FIG. 2A.

FIG. 2C depicts further continuation of the example input resource-parameter table of FIG. 2A and FIG. 2B.

FIG. 4 depicts an exemplary scoring matrix as used by methods and systems disclosed herein.

FIG. 5B depicts a continuation of the high-level flow diagram of FIG. 5A.

DETAILED DESCRIPTION

Figure 1:
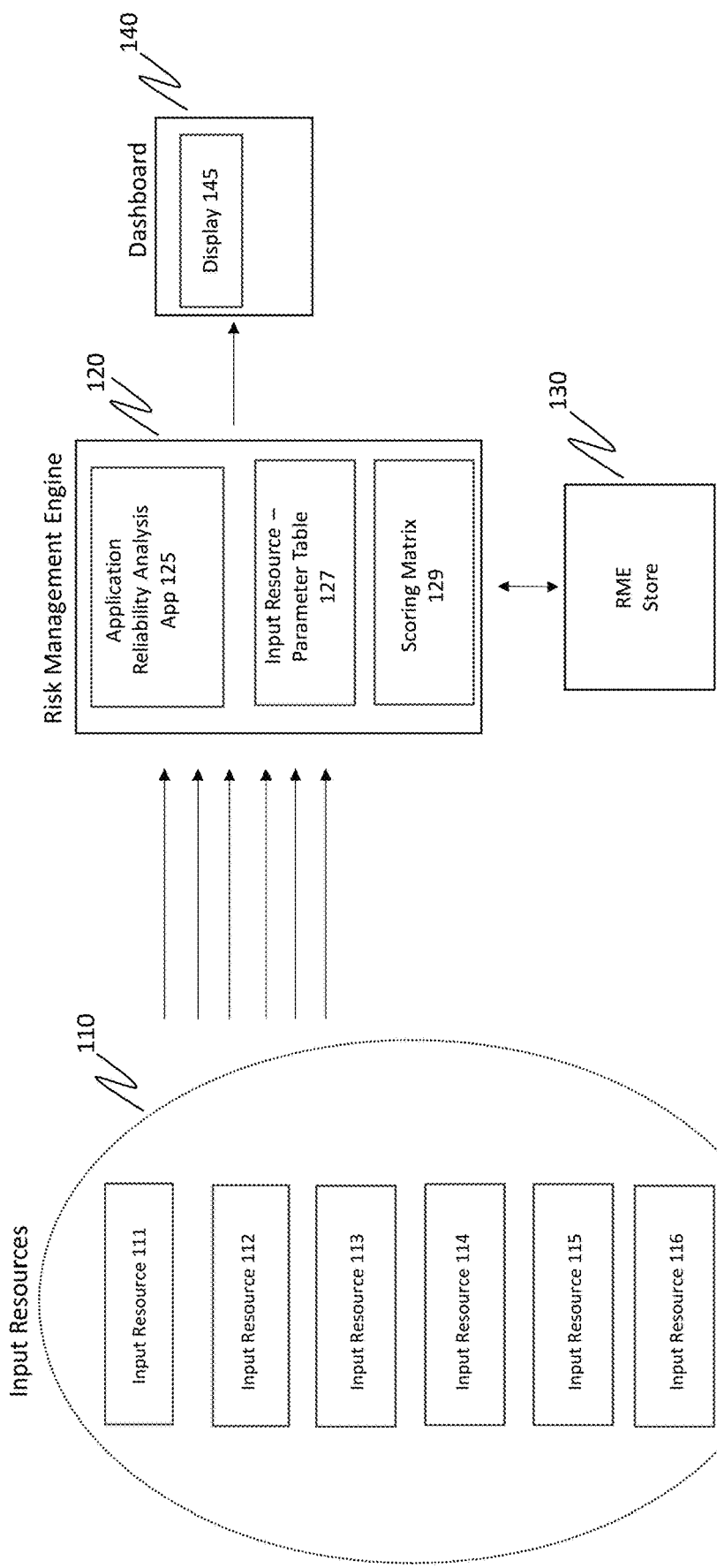
FIG. 1 depicts an illustrative architecture in which techniques and structures for providing the systems and methods disclosed herein may be implemented.

Example implementations of the teachings from the present disclosure provide systems and methods which address one or more of issues described above. FIG. 1 illustrates an example system environment 100 which is operable to facilitate application reliability analysis used to control the deployment of changes. The system environment ("the system") 100 can include one or more input resources 110, risk management engine 120, risk store 130 and dashboard 140. All of the components in the system 100 may be connected by one or more networks (e.g., LAN or WAN). Although the example shows a specific number of resources, any number of resources may be included in the system. Moreover, the system is not limited to the above disclosed components and may include additional components not germane to the claimed subject matter.

An input resource 110 may include one or more computing devices, systems, or services. Each input resource provides information to the risk management engine to perform risk evaluations. An input resource may be configured to continuously monitor or track data relevant to risk evaluations. Any of the one or more input resources may change over time consistent with the information needed to perform risk evaluations.

A risk management engine 120 uses information related to one or more factors to evaluate the risk associated with deploying application changes (i.e., releases). While the disclosure describes factors related to deploying application changes, (i.e., a particular area of interest), factors related to other concerns (i.e., areas of interest) may be used. These factors may represent the major influences that play a role in achieving a particular goal, such as, for example, maintaining consistent reliability of applications in an environment (e.g., an enterprise) during deployment of application changes. In this instance, the major influences may include quality, performance, and stability. These influences may be identified as success factors.

In order to determine a measurable impact of the one or more success factors for one or more applications which are selected for application changes ("selected applications"), one or more parameters reflecting information that contribute to the success of each factor are identified. The one or more parameters represent the most relevant information (i.e., data) aligned with or having an impact on a corresponding success factor. An aggregation of the parameters for the one or more success factors provides a comprehensive look into the risks associated with the area of interest at a system level.

The one or more parameters are customizable and scalable. Moreover, the one or more parameters may be identified, for example, by analyzing historical data using a machine learning model. As new historical data becomes available, the machine learning model may be updated (i.e., refined) with the new historical data to accurately identify the one or more parameters (i.e., updated parameters). At the outset, the risk analysis engine 120 will use initial one or more parameters to evaluate the risk for deploying application changes and, thereafter, the risk analysis engine will use the updated parameters. The updated one or more parameters may be identical to the initial one or more parameters, or the updated one or more parameters may be different from the initial one or more parameters.

In some implementations of the teachings herein, the one or more parameters may be identified, for example, by using a machine learning model to perform root cause analysis on historical data related to incidents caused by deploying application changes. In some other implementations of the teachings herein, the one or more parameters may be identified, for example, by using a machine learning model to perform correlation analysis between different parameters and deployment incidents. In some further implementations of the teachings herein, the one or more parameters may be identified, for example, by using a machine learning model to perform pattern recognition to recognize patterns of incidents and their root causes over time to identify common deployment related issues and their contributing parameters.

Further, the one or more parameters identified for the success factors (i.e., quality, performance, and stability) may include, for example, the parameters listed in FIGS. 2A-2C. For the "Quality" success factor, the one or more parameters may include the amount of code coverage (Code coverage is a white-box testing technique performed to verify the extent to which the code has been executed. Code coverage tools use static instrumentation in which statements monitoring code execution are inserted at critical junctures in the code and measured in percentage) by the automated tests, the code quality as assessed by the number of errors or warnings generated by the tests, the number of pull requests (i.e., requests to incorporate one or more code segments into the existing project: total, or over a particular predefined window of times), the types of software change proposed (whether merely maintenance, a bug fix, a new feature pilot, or a new feature being permanently adopted), and/or the number of tasks per release.

For the "Performance" success factor, the one or more parameters may include error budget (i.e., a way of numbering the services consumed as per the business thresholds by the business), whether there is 24/7 monitoring for Failed Client Interactions/Missed Business Transactions as well as memory and CPU performance (a factor that also takes into consideration which programming language components are written in, and whether multiple languages are used), whether there is external service providers' involvement (and if so, how many external service providers), whether there is a fallback plan for the number of new components per release, the number of new deployable units deploying into production (i.e., number of newly created services), and whether the application is an external service provider's application or instead an in house application. Performance parameters may include a number of parameters specifically defined in terms of a particular organization's needs, such as "Asset Risk Classification (ARR)" (a way of expressing a quantified level of how an organization's assets or priorities will be harmed by downtime), "Application Dependency (IRR)", or application resiliency (i.e., how quickly the application can recover from downtime when there is high frequency of business transactions and also in case of outage, expressed as a quantified tier of the interconnectedness or importance of the particular application).

For the "Stability" success factor, the one or more parameters may include number of incidents for the past 6 months (or another predefined window of time), the number of Failed Business Interactions for the past 6 months, whether the application has adopted Rails for deployment (whether the application has prepared a working, fallback option should the deployment fail to alternate server with exact same configuration. This is an identical alternate environment with apples-to-apples configuration and data interoperability), and whether changes are automatically verified after deployment.

To this end, the one or more input resources 110 included in the system 100 may coincide with the type of information (i.e., reflected by the one or more parameters) needed by the risk management engine to evaluate the risk for deploying application changes. So, for example, one of the one or more resources may include a source code repository (e.g., BitBucket™) which may provide information (data), such as, for example, number of pull requests (i.e., requests to incorporate one or more code segments into the existing project), which is one of the parameters associated with the quality success factor. Other example resources may include an issue tracking/ticket system (e.g., Jira™), unit test coverage and code quality assessor (e.g., Sonarqube™), or other databases storing relevant information about the applications being changed.

In some implementations of the teachings herein, the one or more input resources 110 in system 100 includes a source code repository platform 111, a release planning and issue tracking platform 112, a unit test coverage and code quality platform 113, a deployment configuration/configuration management database (CMDB) 114—which is a database where interdependency and lineage of all software applications and underlying infrastructure components relations are stored and retrieved—an application meta store 115, an application quality store 116, and an application production reliability store 117. These resources provide information related to the one or more parameters (e.g., the parameters listed in FIGS. 2A-2C) to risk management engine 120.

In some other implementations of the teachings herein, one or more of the input resources may send historical data to risk management engine 120.

In some further implementations of the teachings herein, one or more of the input resources may send one or more requests for application changes to one or more applications. For example, a change management ticketing system may send the requests for application changes.

The risk management engine (RME) 130 is a data storage device which stores the score criteria, the one or more parameters, the collected data for the one or more parameters, the weight values for the one or more parameters, etc.

The dashboard 140 is a graphical user interface (GUI) or visual display that provides an overview of key information, data, or metrics in a single, consolidated view. Dashboard 140 receives data from risk management engine 120 and displays the data on a display device.

Figure 3:
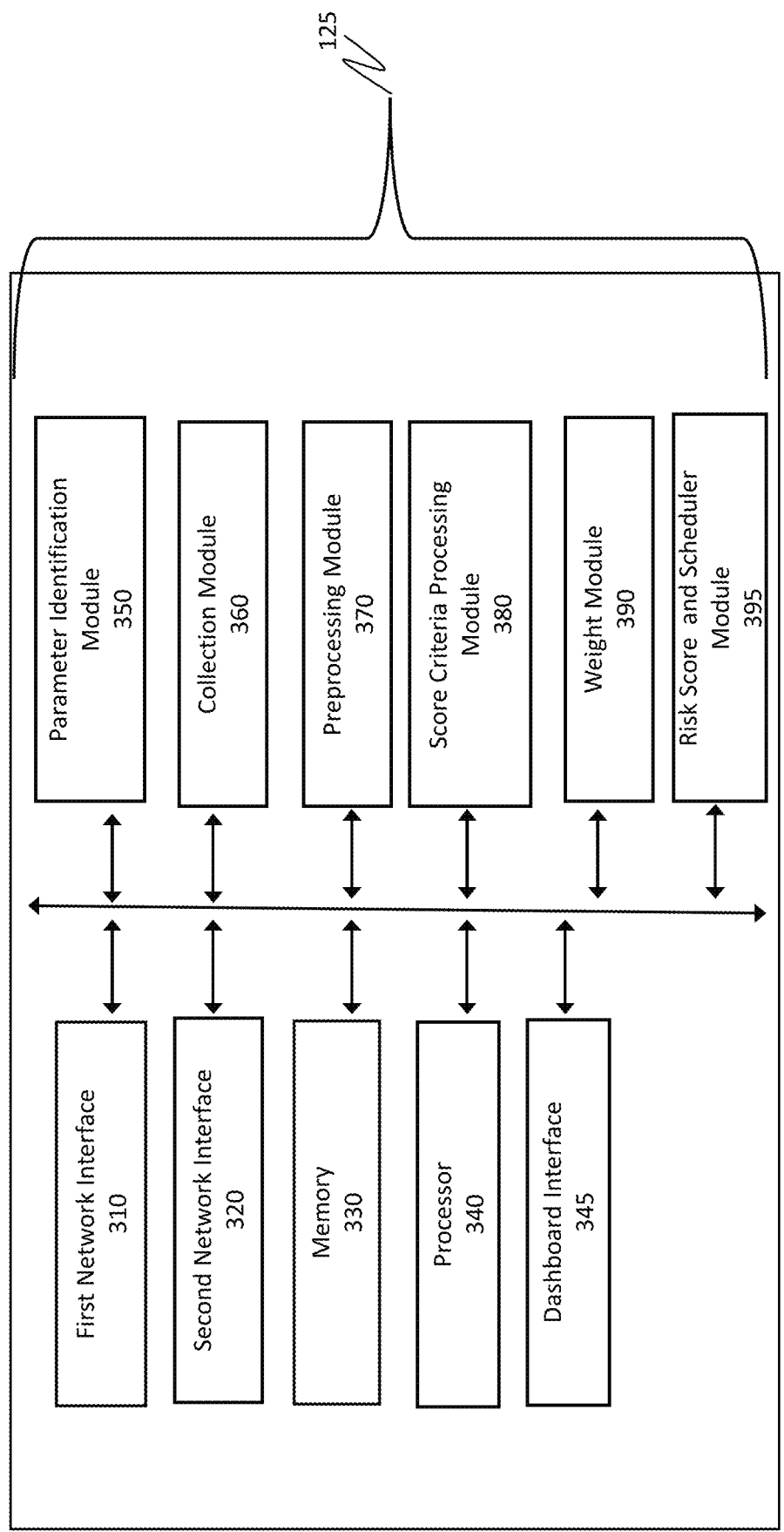
FIG. 3 depicts a high-level block diagram of a representative risk management engine according to an embodiment of the present disclosure.

Turning to FIG. 3, the risk management engine 120 includes a first network interface 310, a second network interface 320, a memory 330, a processor 340, a dashboard interface 345, an application reliability analysis (ARA) application 125 which includes a parameter identification module 350, a collection module 360, a preprocessing module 370, a score criteria processing module 380, a weight management module 390, and a risk score and scheduler module 395.

The first network interface 310 can be configured to receive data from the one or more input resources 110. It should be understood that the first network interface 310 may include any interface configured to send and receive data from any of the one or more input resources.

The second network interface 320 can be configured to receive requests for application changes from a variety of end point sources in an enterprise network connected to the risk management engine 120. It should be understood that the second network interface 310 may include any interface configured to send and receive data from any of the end point sources.

The memory 330 (e.g., random access memory (RAM), non-volatile secondary storage, hard drive, a floppy drive, and a CD-ROM drive) may include one or more libraries (e.g., API library), table (e.g., input resource-parameter table), frame buffers, scheduling queues, and one or more databases (e.g., historical data database) and may store data (e.g., collection data, historical data, score criteria data), business logic rules, applications (e.g., application reliability analysis (ARA) application 125), and computer executable instructions.

Processor 340 is configured to control the operation of risk management engine 120. The processor 340 may include one or more microcontrollers, microprocessors, application specific processors, field programming gate array (FPGA) for managing multiple processes occurring within risk management engine 120. Although one processor is described, the risk management engine 120 may include a plurality of processors.

Dashboard interface 345 receives data from the application reliability analysis (ARA) application 125 and converts the data into graphical elements such as text, icons, charts, symbols, graphics, video, etc., for display. The dashboard interface provides data to dashboard 140.

Parameter identification module contains instructions that when executed by the processor 340, cause the processor to execute a machine learning algorithm which processes historical data to identify one or more parameters. The parameter identification module is fed new historical data on an ongoing basis and continuously identifies the one or more parameters vital to evaluating the risk associated with deploying application changes. The parameter identification module provides the one or more parameters to collection module 360 for further processing.

Further, the parameter identification module contains instructions that when executed by the processor 340, cause the processor to detect when any of the identified one or more parameters are different from the previously identified one or more parameters. In some embodiments, a notification is sent to alert an administrator that one or more of the parameters have changed.

The collection module 360 contains instructions that when executed by the processor 340, cause the processor to collect data from the one or more input resources 110. In some implementations of the teachings herein, the collection module retrieves information (data) from the one or more input resources using an application programming interface ("API": reusable code which can take input in a predefined format and provide an expected outcome). In some other implementations of the teachings herein, the collection module may retrieve the information from the one or more resources from an executed batch job. The collection module may access a library of APIs to interface with the one or more input resources. Moreover, the collection module may access an input resource-parameter table (shown in FIGS. 2A-2C) to determine which input resource to collect corresponding data from based on the one or more parameters received from the parameter identification module 350.

Preprocessing module 370 contains instructions that when executed by processor 340, cause the processor to receive data from collection module 360 and extract relevant information from the data and/or convert it into a format suitable for processing (e.g., score criteria processing, machine learning algorithms, etc.). Preprocessing of the data may include filtering, formatting, data cleaning and feature extraction.

Score criteria processing module 380 contains instructions that when executed by processor 340, cause the processor to calculate a parameter score for the one or more parameters based on the score criteria provided in the input resource-parameter table 127 using the relevant data retrieved from the one or more input resources. Each parameter includes a scoring criterion from which a parameter score may be calculated. The scoring criteria for each parameter may be determined from an established set of rules, guidelines, standards, from which an evaluation will be made. Referring back to FIGS. 2A-2C, each parameter includes a scoring criterion. For example, one is "Code Coverage", a white-box testing technique performed to verify the extent to which the code has been executed. Code coverage tools use static instrumentation in which statements monitoring code execution are inserted at critical junctures in the code and the parameter is measured as a percentage of the total amount of code. In this example, "Code Coverage" has the following scoring criteria:

1—Code tested percentage less than 50%
2—Code tested percentage less than 75%
3—Code tested percentage less than 95%
4—Code tested percentage less than 100%

Using the relevant data retrieved for this parameter, which reflects the code tested percentage for a particular application, the score criteria processing module will determine the parameter score. So, if the code tested percentage reflects less than 100%, then the parameter score will be identified as 4. The parameter score will be provided to the risk score and scheduler module for further processing.

The weight module 390 contains instructions that when executed by the processor 340, cause the processor to determine a weight for each of the one or more parameters. Each weight value represents the importance of a corresponding parameter relative to the other parameters. The combined weight values for the one or more parameters equals one hundred (100) percent. The weight value for each parameter may be determined using data (e.g., historical data) and statistical analysis, such as, for example, machine learning algorithms, correlation analysis and/or regression analysis. The weight values for the one or more parameters are provided to the risk score and scheduler module 395 for further processing.

Further, the weight module 390 contains instructions that when executed by the processor 340, cause the processor to detect when any of the weight values for the one or more parameters are different from the previously identified weight values. In some implementations of the teachings herein, a notification is sent to alert an administrator that one or more of the weight values have changed.

The risk score and scheduler module 395 contains instructions that when executed by the processor 340, cause the processor to determine a change risk score for one or more selected applications. The risk score module 395 receives a parameter score (from score criteria processing module 380) and a weight (from weight module 390) for each parameter and calculates a change risk score using parameter scores and weights based on the following formula:

Change Risk Score for Application (A)=
(ParameterScore1*Weight1+
ParameterScore2*Weight2+ . . .
+ParameterScoreN*WeightN)/(Weight1+
Weight2+ . . . +WeightN), where Value1,
Value2, . . . , ValueN represent the individual
parameter scores and Weight1, Weight2, . . . ,
WeightN represent the weights assigned to each
parameter.

In some implementations of the teachings herein, one or more of the parameters may not be relevant for a particular selected application. In this instance, a parameter score and weight for the particular parameter will not be included in the risk score formula.

After a change risk score is determined for each selected application, the risk score module determines a corresponding risk level for each selected application using an established scoring matrix, such as, for example, the scoring matrix 129 shown in FIG. 4. The scoring matrix identifies a plurality of risk levels and a corresponding value range for each risk level. In a preferred implementation, deployment of software will only occur when the lowest or second-lowest risk level is achieved (that is, with a score of 1.5 or below, assuming the parameters and weighting matrices illustrated in FIGS. 2A, 2B, and 2C are used).

The risk score and scheduler module 395 may rank the selected applications from low risk to high risk. The ranked list may be provided to dashboard interface 345 for display on dashboard 140. Further, for each selected application, the risk score and scheduler 395 makes a "Go" or "No Go" determination as to whether each selected application may proceed with deployment of the application changes based on a predetermined risk level threshold. For example, for all selected applications with a risk level of low or low medium, a "Go" determination is made, and for all selected applications with a risk level of medium, medium high, or high, a "No Go" determination is made.

For all selected applications with a "Go" determination, the risk score and scheduler module 395 initiates an automated deployment process and for all selected applications with a "No Go" determination, the risk score and scheduler denies the request to deploy application changes (i.e., prevents the deployment of the application changes). Further, in some implementations of the teachings herein, the risk score and scheduler module provides recommendations (i.e., risk mitigators) that could be implemented by human operators to reduce the change risk score in future assessments.

Figure 5A:
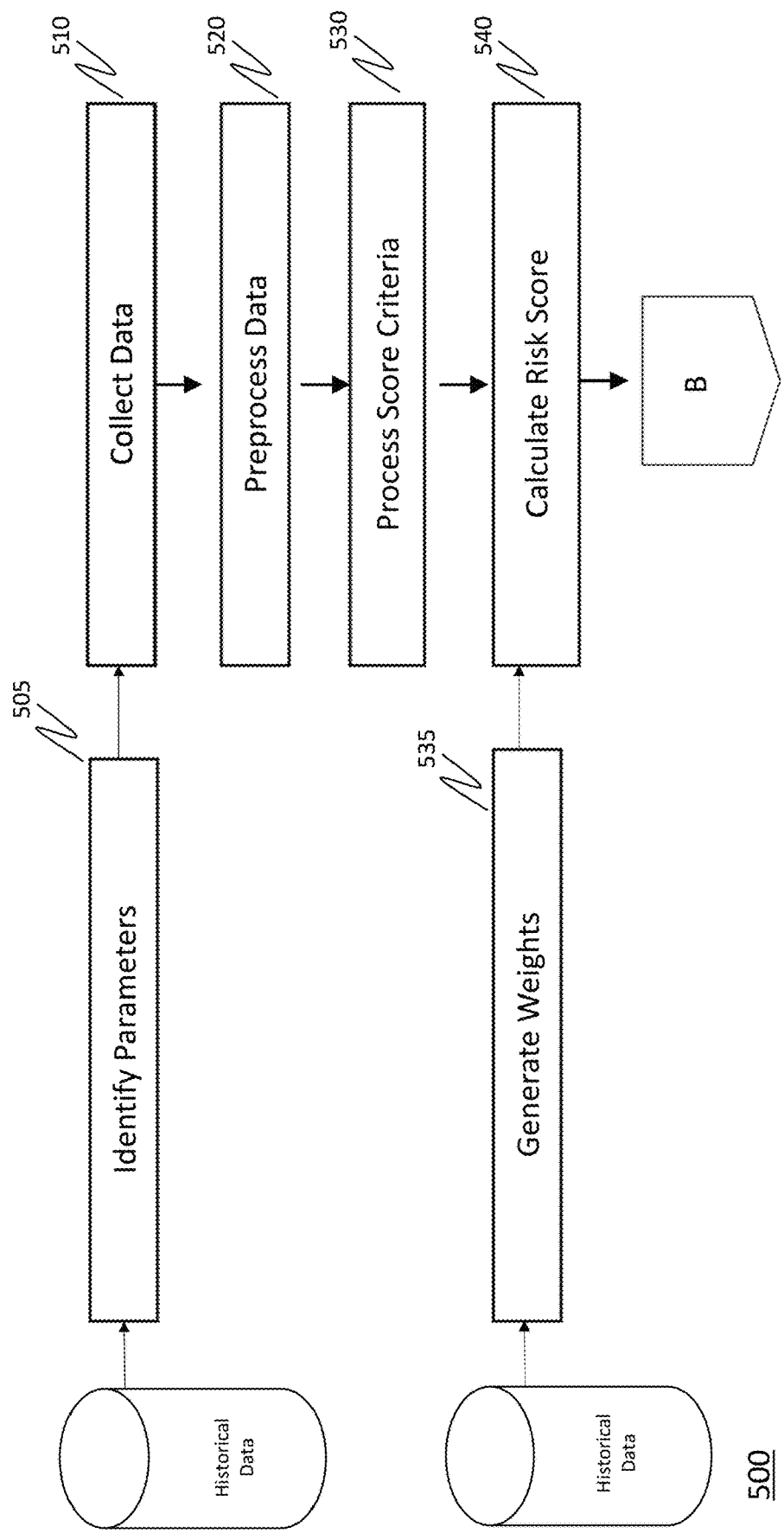
FIG. 5A depicts a high-level flow diagram of an application reliability analysis process according to an embodiment of the present disclosure.

Turning to FIGS. 5A-5B, an example high level flow diagram 500 of a method for performing application reliability analysis in a system 100 according to teachings of the present disclosure.

At step 505, parameter identification module 350 continuously receives historical data and identifies one or more parameters vital to evaluating the risk associated with deploying application changes for the selected applications. The identified parameters are provided to collection module 360.

At step 510, collection module 360 accesses input resource-parameter table 127 and collects data from the one or more input resources 110. The collected data is transmitted to preprocessing module 370 for further processing.

At step 520, preprocessing module receives data from collection module 360 and extracts relevant information from the data and/or converts it into a format suitable for processing. The preprocessing module transmits the preprocessed data to the score criteria processing module for further processing.

At step 530, score criteria processing module 380 calculates a parameter score for the one or more parameters. The parameter scores are provided to risk score and scheduler module 395 for further processing.

At step 535, weight module 390 continuously receives historical data and determines a weight value for each of the one or more parameters. The weight values are provided to risk score and scheduler module 395 for further processing.

At step 540, risk score and scheduler module 395 calculates a change risk score for each selected application and categorizes the risk at step 550.

At step 560, risk score and scheduler module 395 makes a "Go" or "No Go" determination for each selected application.

At step 570, the determination is a "Go" and the risk score and scheduler module 395 initiates an automated deployment process for the selected application.

At step 580, the determination is a "No-Go" and the risk score and scheduler module 395 denies the requests to make application changes for the selected application. In some implementations, the risk score and scheduler module provides information/recommendations (i.e., risk mitigators) to make to reduce the change risk score, such as, for example, reduce the amount of changes to the selected application.

Example Application

For an example applying all of the above teachings, and the specific parameters and weightings in FIGS. 2A, 2B, and 2C, let us imagine an application that:

has code test coverage (i.e., how much of the source code is being tested by repeatable automated tests) of greater than 95% (score: 0.2-5% times a parameter score of 4), owns more than 10 services (score: 0.15-3% times a parameter score of 5), has 400 pull requests (i.e., requests to incorporate one or more code segments into the existing project) (score: 0.25-5% times a parameter score of 5), for which a new feature pilot has been developed (score: 0.15-5% times a parameter score of 3), has 20 tasks per release (score: 0.09-3% times a parameter score of 3), has two services consumed (score: 0.06-3% times a parameter score of 2), has a Tier 1 resiliency (a measure of software testing that focuses on ensuring that applications will perform well at a peak level of transactions) rating (score: 0.15-5% times a parameter score of 3), is written in two languages (score: 0.3-15% times a parameter score of 2), does not involve any external service providers (score: 0.03-3% times a parameter score of 1), has a particular asset risk classification (score: 0.3-10% times a parameter score of 3), has a particular application dependency (score: 0.1-5% times a parameter score of 2), lacks a fallback plan (score: 0.04-2% times a parameter score of 2), has 20 new deployable units per release (score: 0.08-4% times a parameter score of 2), is exclusively an in house app (score: 0.05-5% times a parameter score of 1), is in the highest tier of incidents over the past 6 months (score: 0.5-10% times a parameter score of 5)

has had over 3000 Failed Business Interactions (score: 0.5-10% times a parameter score of 5), has adopted Rails (i.e, the application has prepared a working, fallback option should the deployment fail, on an alternate server with exactly the same configuration. The identical alternate environment allows for apples-to-apples migration of configuration and other information. Adopting Rails, an exactly same alternate environment, helps applications to avoid business interruption in the event of software or infrastructure outage by switching application to the alternate environment once the current one fails.) (score: 0.04-2% times a parameter score of 2), and lacks automatic verification of changes after deployment (score: 0.04-2% times a parameter score of 2).

Upon adding together all of these weighted scores, the result of 3.03 will be reached. Consulting the configuration table in FIG. 4, the risk will be classified by the system as "HIGH" and automated deployment of the application will be prevented.

If, upon future changes to these individual factors, the resultant sum were to be decreased to only 1.10—for example, by reducing incidents, scaling back the scope of the changes, etc.—the risk would be classified as "LOW-MEDIUM" and the changes could be automatically approved.

Computing Devices Generally

Figure 6:
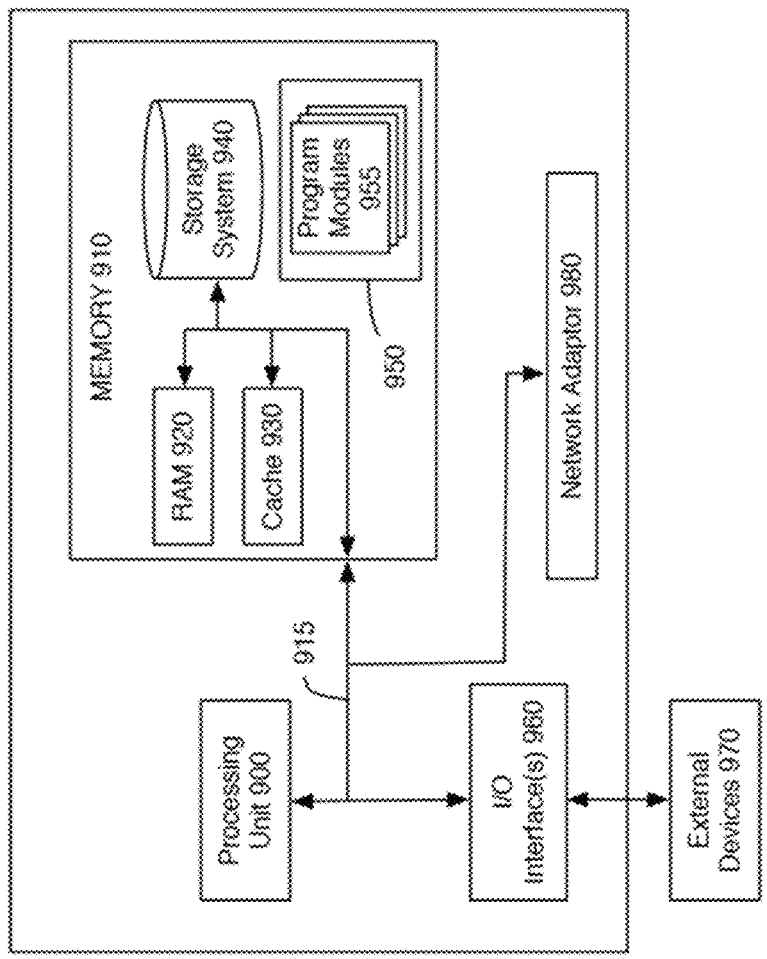
FIG. 6 is a high-level block diagram of a representative computing device that may be utilized to implement various features and processes described herein.

Although FIG. 1 depicts a preferred configuration of specific computing devices for accomplishing the software-implemented methods described above, those methods do not inherently rely on the use of any particular specialized computing devices, as opposed to standard desktop computers and/or web servers. For the purpose of illustrating possible such computing devices, FIG. 6 is a high-level block diagram of a representative computing device that may be utilized to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 6, the components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular implementations including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of implementations described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.: one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer implemented method performed in a computer system based upon an application reliability analysis, the method comprising the steps of:
   analyzing historical data for one or more applications on an ongoing basis, using a machine learning model, to identify one or more parameters affecting system quality, and/or one or more parameters affecting system performance, and/or one or more parameters affecting system stability;
   generating, for each of the one or more applications, a change risk score for each application based at least in part on a weighted average of one or more parameters affecting system quality, a weighted average of one or more parameters affecting system performance, and a weighted average of one or more parameters affecting system stability;
   categorizing a risk for each of the one or more applications based upon the change risk score;
   determining for each of the one or more applications whether changes for an application of the one or more applications can be deployed based on the categorized risk of the application's change risk score; such that
   if changes for the application can be deployed, performing an automated deployment process that deploys the changes for the application; and
   if changes for the application cannot be deployed, preventing the deployment of any changes for the application;
   using new historical data, as the new historical data becomes available, on an ongoing basis, to update the machine learning model, so as to allow the analyzing to more accurately identify updated parameters; and
   using the machine learning model to perform pattern recognition to recognize patterns of incidents and their root causes over time to identify common deployment related issues and their contributing parameters.

2. The method of claim 1 further comprising the step of providing one or more risk mitigators for each application in which it has been determined that changes cannot not be deployed.

3. The method of claim 1 further comprising determining a parameter score for each of the one or more parameters affecting system quality, the one or more parameters affecting system performance, and the one or more parameters affecting system stability.

4. The method of claim 1 wherein each weight value used in the weighted average is tunable.

5. The method of claim 1 wherein the one or more parameters affecting system quality, system performance and system stability are variable.

6. The method of claim 1 wherein the one or more parameters affecting system quality, system performance and system stability are scalable.

7. The method of claim 1 wherein one of the one or more parameters affecting system performance is an identified dependency between any of the one or more applications.

8. The method of claim 1 wherein a scoring matrix is used to aid in the determination of whether the changes for a corresponding application can be deployed based on the application's change risk score.

9. A computer implemented method performed in a computer system based upon an application reliability analysis, the method comprising the steps of:
   analyzing historical data for one or more applications on an ongoing basis, using a machine learning model, to determine a weight value for each of one or more parameters affecting system quality, and/or one or more parameters affecting system performance, and/or one or more parameters affecting system stability;
   generating, for each of the one or more applications, a change risk score for each application based at least in part on a weighted average of one or more parameters affecting system quality, a weighted average of one or more parameters affecting system performance, and a weighted average of one or more parameters affecting system stability;
   categorizing a risk for each of the one or more applications based upon the change risk score;
   determining for each of the one or more applications whether changes for an application of the one or more applications can be deployed based on the categorized risk of the application's change risk score; such that
   if changes for the application can be deployed, performing an automated deployment process that deploys the changes for the application; and
   if changes for the application cannot be deployed, preventing the deployment of any changes for the application;
   using new historical data, as the new historical data becomes available, on an ongoing basis, to update the machine learning model, so as to allow the analyzing to more accurately identify updated parameters; and
   using the machine learning model to perform pattern recognition to recognize patterns of incidents and their root causes over time to identify common deployment related issues and their contributing parameters.

10. The method of claim 9 further comprising the step of providing one or more risk mitigators for each application in which it has been determined that changes cannot not be deployed.

11. The method of claim 9 further comprising determining a parameter score for each of the one or more parameters affecting system quality, the one or more parameters affecting system performance, and the one or more parameters affecting system stability.

12. The method of claim 9 wherein each weight value used in the weighted average is tunable.

13. The method of claim 9 wherein the one or more parameters affecting system quality, system performance and system stability are variable.

14. The method of claim 9 wherein the one or more parameters affecting system quality, system performance and system stability are scalable.

15. The method of claim 9 wherein one of the one or more parameters affecting system performance is an identified dependency between any of the one or more applications.

16. The method of claim 9 wherein a scoring matrix is used to aid in the determination of whether the changes for a corresponding application can be deployed based on the application's change risk score.

17. The method of claim 9 further comprising:
using the machine learning model to perform a root cause analysis on the historical data.

18. The method of claim 9 further comprising:
using the machine learning model to perform correlation analysis between different parameters and deployment incidents.

19. A system for controlling deployment of one or more changes to one or more applications of a computer system based upon an application reliability analysis, the system comprising:
one or more input resources;
one or more storage devices, including at least one database;
one or more processors;
one or more network interfaces for communication with the one or more input resources;
a machine learning model; and
a non-transitory memory comprising instructions that, when executed by the one or more processors, cause the one or more processors to:
analyze historical data for one or more applications on an ongoing basis, using the machine learning model, to determine a weight value for each of one or more parameters affecting system quality, and/or one or more parameters affecting system performance, and/or one or more parameters affecting system stability;
generate, for each of the one or more applications, a change risk score for each application based at least in part on a weighted average of one or more parameters affecting system quality, a weighted average of one or more parameters affecting system performance, and a weighted average of one or more parameters affecting system stability;
categorize a risk for each of the one or more applications based upon the change risk score;
determine for each of the one or more applications whether the changes for an application of the one or more applications can be deployed based on the categorized risk of the application's change risk score; such that
if changes for the application can be deployed, performing an automated
deployment process that deploys the changes for the application; and
if changes for the application cannot be deployed, preventing the deployment of any changes for the application;
use new historical data, as the new historical data becomes available, on an ongoing basis, to update the machine learning model, so the analysis of the historical data will more accurately identify updated parameters; and
use the machine learning model to perform pattern recognition to recognize patterns of incidents and their root causes over time to identify common deployment related issues and their contributing parameters.

* * * * *